Oct. 20, 1970    D. ROVETI    3,535,592
RAPIDLY OPERATING SOLID STATE ELECTRONIC SWITCH WITH
PARALLED TRIPPING PATH
Filed Sept. 5, 1967

INVENTOR.
DENES ROVETI
BY
William Grobman

United States Patent Office 3,535,592
Patented Oct. 20, 1970

3,535,592
RAPIDLY OPERATING SOLID STATE ELECTRONIC SWITCH WITH PARALLEL TRIPPING PATH
Denes Roveti, 1643 Forest Drive,
Annapolis, Md. 21403
Filed Sept. 5, 1967, Ser. No. 665,545
Int. Cl. H02h 7/00
U.S. Cl. 317—33                                    4 Claims

ABSTRACT OF THE DISCLOSURE

An electronic circuit breaker which has a fast response time and is formed of solid-state components for reliability. It comprises a silicon-controlled rectifier as the breaker switch element. The rectifier is placed in series with the load to be protected and with an adjustable impedance, the voltage drop across which is sensed when the rectifier is conducting. When the potential drop across the impedance reaches too high a value, indicating an overload, another sensing SCR is triggered on, allowing current to flow into the base of a transistor placed in parallel with the breaker switch. The current flow through the parallel path drops the current passing through the breaker switch to a value below that required to maintain conduction through the breaker switch, and the circuit opens. A manual reset switch is provided to apply a turn-on pulse to the breaker switch to close the circuit again.

---

This invention relates to high voltage circuit breakers and, more particularly, to solid-state systems for rapidly interrupting the current flowing in a circuit in case of a prescribed current or voltage overload.

In spite of the many approaches, improvements and innovations in the overload switching art, there is a need for a fast switch capable of operating up to 400 to 500 volts A.C. and D.C. and being able to interrupt from a few milliamperes to more than 10 amperes. This invention comprises a circuit breaker which is D.C. coupled, simple, and inexpensive in construction and maintenance. It operates in microseconds to interrupt current flowing through a load in which a selected overload occurs. In addition, the circuit of this invention contains a built-in time constant which serves to prevent overloading the circut breaker and offers a full, dead short-circuit protection independent of source impedance should a sudden, violent overload occur.

There are several theories upon which circuit breakers are designed to operate. In one, an overload through a series resistance generates excessive heat which melts the resistance, or, in another, operates a thermal switch. Or, in a third, the excessive current can generate a magnetic field sufficient to open a relay or to trip a spring-loaded switch. And so on.

In the device of this invention, the changes in potential drop produced across an adjustable impedance by variations in current flowing through a load are sensed. When a prescribed potential drop is reached, an electronic trip causes the short-circuiting of the switch which is in series with the load, causing that switch to open. The entire operation can occur in an interval as short as 10 microseconds. The main conduction element for the breaker is a silicon-controlled rectifier and diodes capable of handling heavy currents while the shunt path for opening the breaker is a high voltage transistor which is suitable for heavy currents in a short duty cycle.

It is an object of this invention to provide a new and improved circuit breaker.

It is another object of this invention to provide a new and improved circuit breaker which is fast acting.

It is a further object of this invention to provide a new and improved circuit breaker which is inexpensive to construct and maintain, which is reliable, which is rugged, and which can operate on A.C. and D.C. of more than 500 volts maximum.

Other objects and advantages of this invention will become more apparent as the following description proceeds, which description should be considered together with the accompanying drawings in which.

Figure 1:
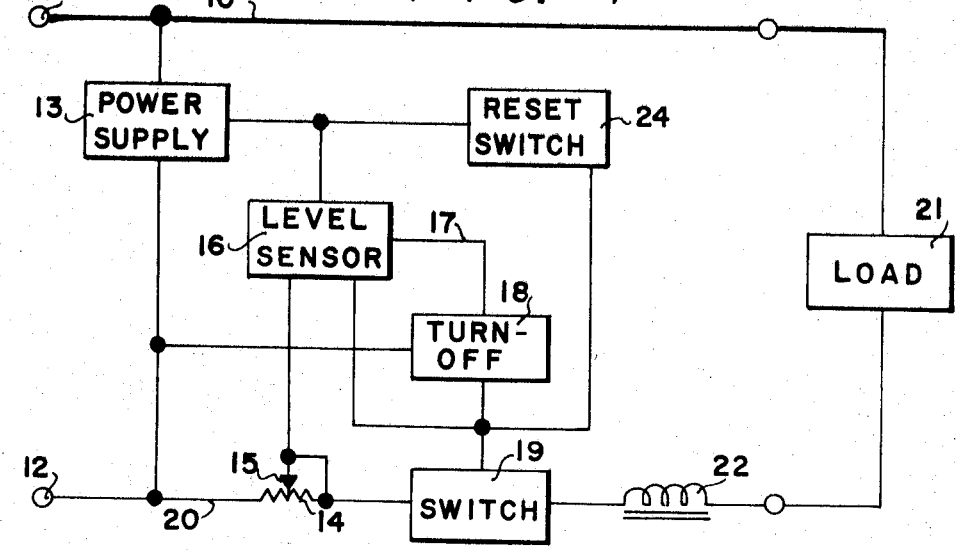
FIG. 1 is a block diagram of the circuit breaker of this invention.

Referring to the drawings in detail, FIG. 1 shows, in block form, the relationship of the various parts of the circuit breaker of this invention.

The reference character 11 designates one input terminal, and character 12 the other input terminal of power lines 10 and 20. For this discussion, the power lines will be considered to be carrying direct current, but the circuit breaker of this invention can just as well serve in an alternating current, or pulse, circuit. Connected in series with one of the lines 20 is a potentiometer 14 having a slide contact 15 which is connected to a control input of a level sensing device 16. An output of the level sensing device 16 is applied through a line 17 to an input of a turn-off means 18, which, in turn, controls the conduction of a switch 19 in series in line 20. A load 21 is connected across the power lines 10 and 20, and the current drawn by the load 21 from the terminals 11 and 12 passes through an inductance 22, the switch 19, and the potentiometer 14. Power is supplied to the level sensor 16, the turn-off means 18 and the switch 19 from a power supply 13 connected across the terminals 11 and 12. A reset 24 is activated from the power supply 13 and serves to close the switch 19 after it has been opened.

In operation, the slide contact 15 is moved along the potentiometer 14 to the point where the desired current flow through the load 21 will produce the proper voltage drop across the potentiometer 14. Should the current drawn by the load 21 exceed the desired amount, the voltage drop across the potentiometer 14 will increase. When the current flow exceeds the limit, the level sensor 16 has a triggering potential applied to it and develops an output potential which is applied to the turn-off means 18, causing that means to operate. Operation of the turn-off means 18 causes the switch 19 to open and interrupt the flow of current through the power lines 10 and 20. Because the elements of the circuit breaker, as will be discussed below, are current-sensitive solid-state devices, an inductor 22 is inserted in one of the power lines, 10 or 20. Should a very rapid increase in the load 21 occur, the current pulse through the circuit will be delayed by the inductance of the inductor 22, permitting the circuit time to operate before damaging current values are achieved. The reset 24 includes a manually operated switch which applies a starting pulse to the switch 19 to close it for subsequent operation of the circuit.

Figure 2:
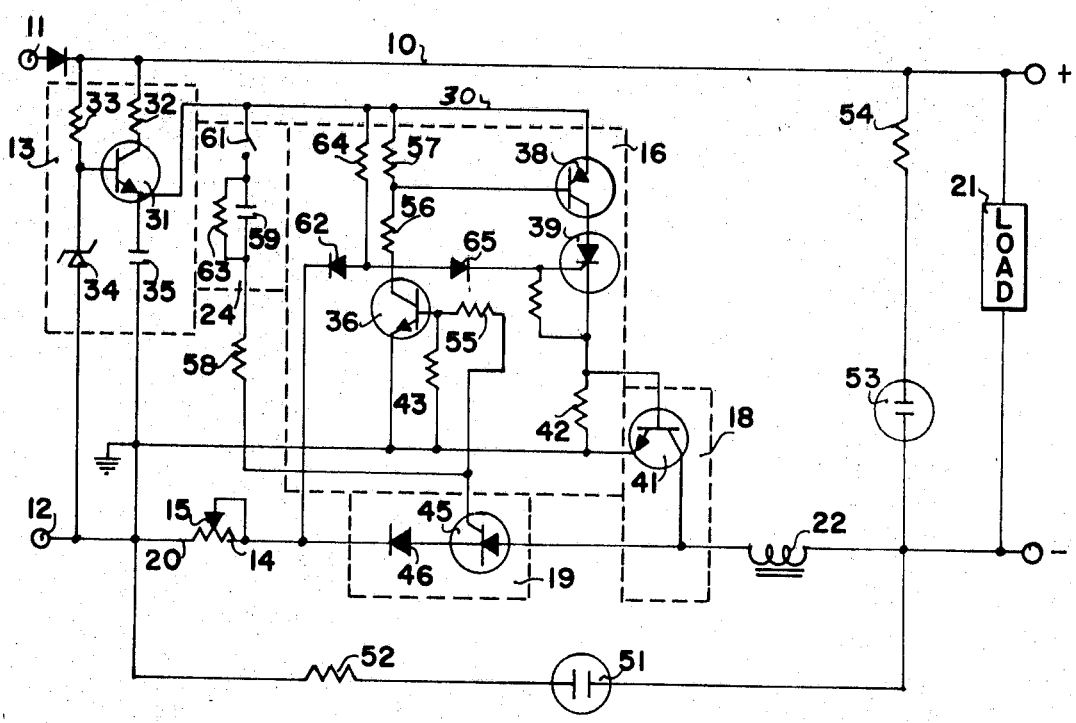
FIG. 2 is a schematic circuit diagram of the circuit breaker of this invention.

The details of the circuit breaker of this invention are better shown in FIG. 2 in which the portions of the circuit breaker shown in block form in FIG. 1 are also shown in FIG. 2 in dashed lines bearing the same reference characters. Thus, the input terminals 11 and 12 are connected to power lines 10 and 20 respectively, across which a load 21 is connected. The power supply 13 comprises a transistor 31 which has its collector connected to the line 10 through a resistor 32 and its emitter electrode connected to the line 20 through a relatively large capacitor 35. The base electrode of the transistor 31 is connected through a resistor 33 to the terminal 11 and through a Zener diode to the terminal 12. The power line 30 supplies the power for the circuit breaker elements and is connected to the emitter electrode of the transsistor 31, or, in other words, to one side of the capacitor 35. In series in the line 20 are the potentiometer 14, having the slide contact 15, the switch 19, which comprises a silicon-controlled rectifier 45 in series with a voltage dropping diode 46, and the inductor 22. The voltage drop across the potentiometer 14 is applied to the control electrode of a second silicon-controller rectifier (SCR) 39. The SCR 39 has its cathode connected to a ground line (the other side of the capacitor 35) through a resistor 42 and also to the base electrode of the transistor 41 which comprises the turn-off means 18. The emitter electrode of the transistor 41 is connected to the ground line, and the collector electrode of the transistor 41 is connected to the anode of the SCR 45. The anode of the SCR 39 is connected in series with the collector-emitter circuit of a transistor 38, the emitter of which is connected to the emitter of the transistor 31 and the collector of which is connected to the anode of the SCR 39. Thus, the transistor 38, the SCR 39 and the resistor 42 are connected in series across the capacitor 35. A transistor 36 has its base electrode connected through a resistor 55 to the gate electrode of the SCR 45 and through another resistor 43 to ground, its emitter electrode connected to the ground line, and its collector electrode connected through a pair of resistors 56 and 57 in series to the power line 30. The base electrode of the transistor 38 is connected to the junction of the resistors 56 and 57. Also connected to the gate electrode of the SCR 45 is one side of a series combination comprising a resistor 58, a parallel arrangement of a capacitor 59 and resistor 63, and a switch 61. The other side of the switch 61 is connected to the power line 30. A pair of latching diodes 62 and 65 are reversely connected in series between slide contact 15 and the gate electrode of the SCR 39. Bias is supplied to the latching diodes 62 and 65 by a resistor 64 connected between the junction of the diodes 62 and 65 and the power line 30.

In operation, the power is supplied to the load 21 through application to the input terminals 11 and 12. The slide contact 15 is adjusted on the potentiometer 14 to the desired overload point. To ensure that the circuit is operating, the reset switch 61 is momentarily closed to apply a pulse to the gate electrode of SCR 45, rendering that rectifier conductive. When SCR 45 conducts, its gate electrode assumes a potential which is somewhat higher than that of the anode of the diode 46. The voltage at the anode of the diode 46 is above the potential of the slide contact 15. This voltage with respect to the ground line is applied to the base electrode of the transistor 36 through the resistor 55 to render that transistor conductive and saturated. In essence, when a turn-on pulse is applied to SCR 45 by momentarily closing switch 61, SCR 45 acquires a self-bias on its gate due to current flow through it. This self-bias voltage on the gate electrode may be a logarithmic function of the amount of current flowing through SCR 45, varying typically from 0.6 to 1.2 volts, while the anode current through SCR 45 may vary from 10 milliamperes to 10 amperes. This approach allows positive sensing of the load current in terms of voltage over a wide range by means of transistor 36. Once the current in SCR 45 drops below its holding value, the gate voltage suddenly drops to zero.

Current through the transistor 36 also passes through the resistors 56 and 57, applying a bias potential to the base electrode of the transistor 38 to render that transistor conductive. However, conduction through the transistor 38 does not take place until the SCR 39 becomes conductive. So long as the transistor 36 conducts, however, the transistor 38 is biased on. Should be current-flow through the load 21 increase beyond the cut-off point determined by the setting of the potentiometer 14, the potential drop at the slide contact 15 with respect to the ground line increases. This increase in potential is applied to the gate electrode of the SCR 39 through the diodes 62 and 65 to render the SCR 39 conductive. When SCR 39 conducts, at least part of the charge on the capacitor 35 is suddenly applied to the series circuit of transistor 38, SCR 39 and resistor 42. The sudden increase in potential across the resistor 42 applies a turn-on pulse to the base electrode of the transistor 41, which conducts and closes a path parallel to that containing the SCR 45. Conduction through the parallel path of transistor 41 suddenly decreases the potential drop across the series arrangement of the SCR 45, the diode 46 and the potentiometer 14. The inductor 22 prevents a sudden rise in current flow through the load 21. When the potential across the path containing the SCR 45 drops, the voltage across the SCR reverses, or, at the least, drops below the point where conduction is sustained, and the SCR 45 opens up. When conduction through the potentiometer 14 ceases, the voltage applied to the base electrode of the transistor 36 drops to the point where that transistor no longer conducts, dropping the voltage developed across the resistor 57 below the value required to maintain transistor 38 in a conductive state. Thus, once SCR 45 is turned-off, most of the charge on the capacitor 35 remains, and the breaker is open-circuited. All other elements become non-conductive. This whole sequence occurs in microseconds. The load 21 is isolated from the power source which is connected to terminals 11 and 12 and current flows only through the leakage path formed by inductor 22 and transistor 41. This path has an impedance in the order of several megohms.

The power supply 13 is operative so long as operating voltage is applied across the terminals 11 and 12. Current flowing through the Zener diode 34 and the resistor 33 maintains the base electrode of the transistor 31 at a constant potential to cause the transistor 31 to operate as a substantially constant current device. Assume that the capacitor 35 is charged, and power is supplied to the power line 30. So long as SCR 45 is conducting and current flows through the load 21, a gas glow tube 53 connected in series with a current limiting resistor 54 across the load 21 glows to show that the circuit through the load 21 is complete. When the SCR 45 opens, the glow tube 53 is extinguished, and glow tube 51 connected in series with a resistor 52 across the line containing the SCR 45 ignites. This indicates that the circuit through the load 21 is open. The neon device 53 fulfills a dual purpose. It indicates when the breaker is on as well as supplying a hold-on current for SCR 45 in case of no load or light load condition.

To close the circuit again, the reset switch 61 is momentarily closed, applying a pulse from the power line 30 to the gate electrode of the SCR 45 to turn that SCR on. As explained above, once current flows through the load 21, the SCR 45, the diode 46 and the potentiometer 14, the transistor 36 becomes conductive and saturates applying a conductive bias to the transistor 38 base electrode. The circuit breaker is again ready to operate.

The circuit described above is fast acting, responding to a change in current flow in about 20 microseconds, and may be used in circuits of 500 volts or greater. It has the added advantage of being completely D.C. coupled, thus adding to its reliability. The current controlled by the circuit varies with the sizes of the components used, in particular, the SCR 45. By using solid-state devices, such as the transistor 41, the voltage drop across the conducting elements are maintained very small, assuring reliable operation. In addition, the voltage drop across the switch is also maintained low, in the order of two volts. Thus, if the circuit controls ten amperes, it dissipates only about 20 watts, keeping the efficiency of the circuit high.

The three-terminal circuit shown in the figures and described above is the basic circuit of this invention. However, it also can be constructed as a two-terminal breaker by using the voltage drop across the series pass element as the power supply. It has been shown in a direct current circuit to keep the explanation as simple as possible. The same circuit can be operated in alternating current paths as well. For A.C. operation, the power supply 13 has a rectifier and filter connected across the A.C. line. The rectifier can be a bridge type connected with the positive side applied to terminal 11 and the negative side to terminal 12. This way potentiometer 14 senses both negative and positive peaks. In addition, for example, a crossover circuit may be added so that a pulse is applied to the SCR 45 each time the alternating current passes through zero to maintain that SCR conductive. This technique allows operation from 50 Hz. to several thousand Hz. Similar other devices may be added to render the circuit more suitable in other electrical systems for controlling high voltage pulses or D.C. circuits with deadshort protection, remote programming, or for use as a power breaker by sensing both current and voltage.

The above specification has described a new and improved high voltage A.C.-D.C. rapidly operating circuit breaker which is rugged and reliable. The new breaker of this invention overcomes many of the disadvantages of the prior art breakers and operates in a shorter time interval and can control high voltages at high power levels (5 kw. and up). In addition, the breaker contains a time constant producing impedance to serve as a self-protective means. It is realized that others in the art may utilize the principles of this invention in devices which are not patentable hereover.

What is claimed is:

1. A circuit breaker having at least two terminals for interrupting the flow of electrical energy to a load upon the occasion of an overload, said circuit breaker comprising a breaker switch having at least two first power electrodes and a first control electrode, a first impedance, means for connecting in series said first impedance and the two first power electrodes of said breaker switch, means for connecting a load in series with said series impedance and electrodes and for applying electrical energy to said series arrangement, means for sensing the potential drop across said first impedance, means controlled by said sensing means for shunting said first power electrodes in case of an overload to reduce the potential drop across said breaker switch to a value below that required to maintain conduction through said two first power electrodes, a delaying impedance connected in series with said two first power electrodes for delaying sudden changes in current-flow through said breaker switch to provide sufficient time for said circuit breaker to operate without damage to said circuit breaker, said breaker switch comprising a solid-state switching element having said two first power electrodes and said first control electrode, conduction through said switching element being initiated by the potential applied to said first control electrode and being interrupted by a loss of potential across said first power electrodes, said shunting means comprising a controllable conductive device, said conductive device comprising at least a pair of conduction terminals and a second conduction control electrode, conduction being instituted between said conduction terminals by the application of a potential to said second conduction control electrode, means connecting said second conduction control electrode to the output of said sensing means, means for directly connecting said conduction terminals in parallel with said series connected first power electrodes and first impedance, said parallel first power electrodes and conduction terminals being connected in series with said load so that said sensing means applies a signal to said second conduction control electrode to institute conduction through said conduction terminals and short-circuit said breaker switch.

2. The circuit breaker defined in claim 1 further including a bias resistor connected to said second conduction control electrode of said shunting means, said bias resistor being connected to the output of said sensing means so that the current flowing through said sensing means passes through said bias resistor to produce a bias potential thereacross, said bias potential being applied to the second conduction control electrode.

3. A circuit breaker having at least two terminals for interrupting the flow of electrical energy to a load upon the occasion of an overload; said circuit breaker comprising a breaker switch having at least two first power electrodes and a first control electrode; a first impedance; means for connecting in series said first impedance, the two first power electrodes of said breaker switch and a load; means for applying electrical energy to said series arrangement; means for sensing the potential drop across said first impedance; means controlled by said sensing means for shunting said first power electrodes in case of an overload to reduce the potential drop across said breaker switch to a value below that required to maintain conduction through said two first power electrodes; said shunting means comprising a controllable conductive device; said conductive device comprising at least a pair of conduction terminals and a second conduction control electrode, conduction being instituted between said conduction terminals by the application of a potential to said second conduction control electrode; means connecting said second conduction control electrode to the output of said sensing means; a bias resistor connected to said second conduction control electrode of said shunting means; said bias resistor being connected to the output of said sensing means so that the current flowing through said sensing means passes through said bias resistor to produce a bias potential thereacross; said bias potential being applied to the second conduction control electrode; and a charged capacitor connected in series with said sensing means and said bias resistor; said sensing means providing a conduction path for deriving energy from said capacitor through said bias resistor when an overload is sensed.

4. A circuit breaker having at least two terminals for interrupting the flow of electrical energy to a load upon the occasion of an overload; said circuit breaker comprising a breaker switch having at least two first power electrodes and a first control electrode; a first impedance; means for connecting in series said first impedance, the two first power electrodes of said breaker switch and a load; means for applying electrical energy to said series arrangement; means for sensing the potential drop across said first impedance; means controlled by said sensing means for shunting said first power electrodes in case of an overload to reduce the potential drop across said breaker switch to a value below that required to maintain conduction through said two first power electrodes; the conduction through said two first power electrodes producing a potential drop between each of said first power electrodes and said control electrode; the potential drop between said control electrode and said first power electrode connected to said impedance being maintained substantially constant throughout the operating current range of said breaker switch; and means for sensing said potential drop between said control electrode and said first power electrode to indicate the state of conduction through said first power electrodes.

References Cited

UNITED STATES PATENTS

| 3,256,448 | 6/1966 | Ogawa et al. | |
|---|---|---|---|
| 3,303,388 | 2/1967 | Means | 317—33 |
| 3,369,154 | 2/1968 | Swain. | |
| 3,371,262 | 2/1968 | Bird et al. | 317—33 XR |

WILLIAM M. SHOOP, Jr., Primary Examiner

U.S. Cl. X.R.

307—93